(12) United States Patent
Matroni et al.

(10) Patent No.: US 7,118,496 B2
(45) Date of Patent: *Oct. 10, 2006

(54) GOLF BALL

(75) Inventors: Gary Matroni, Agawam, MA (US);
Thomas J. Kennedy, III, Wilbraham, MA (US); Michael J. Tzivanis, Chicopee, MA (US); Mark L. Binette, Ludlow, MA (US); David M. Melanson, Northampton, MA (US)

(73) Assignee: Callaway Golf Company, Carlsbad, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 11/056,719

(22) Filed: Feb. 11, 2005

(65) Prior Publication Data

US 2005/0153793 A1    Jul. 14, 2005

Related U.S. Application Data

(62) Division of application No. 10/626,937, filed on Jul. 25, 2003, now Pat. No. 6,855,076.

(60) Provisional application No. 60/398,379, filed on Jul. 25, 2002.

(51) Int. Cl.
*A63B 37/12* (2006.01)

(52) U.S. Cl. .................................................... 473/378
(58) Field of Classification Search ................ 473/378, 473/351, 367, 368
See application file for complete search history.

(56) References Cited

U.S. PATENT DOCUMENTS

| | | | | |
|---|---|---|---|---|
| 5,484,870 | A | * | 1/1996 | Wu .............................. 528/28 |
| 6,210,293 | B1 | * | 4/2001 | Sullivan ..................... 473/374 |
| 6,309,706 | B1 | * | 10/2001 | Maruoka et al. ......... 427/385.5 |
| 6,645,091 | B1 | * | 11/2003 | Wu et al. ................... 473/377 |
| 6,762,273 | B1 | * | 7/2004 | Dewanjee .................... 528/64 |
| 6,935,970 | B1 | * | 8/2005 | Matroni et al. ............. 473/378 |

* cited by examiner

*Primary Examiner*—Raeann Gorden
(74) *Attorney, Agent, or Firm*—Michael A. Catania; Elaine H. Lo

(57) ABSTRACT

A golf ball component, such as a golf ball cover layer, formed from a high or increased melt index thermoplastic polyurethane, polyurea or polyurethane/polyurea is disclosed. The cover layer may be relatively thin (i.e., 0.075 or less, preferably 0.050 inches or less, more preferably less than 0.040 inches, even more preferably less than 0.030 inches). In addition, an operation in which the outer cover is exposed to an isocyanate solution is described to improve certain physical properties of the resulting golf ball.

22 Claims, 2 Drawing Sheets

GOLF BALL

CROSS REFERENCES TO RELATED APPLICATIONS

The present application is a divisional application of U.S. patent application Ser. No. 10/626,937, filed on Jul. 25, 2003, now U.S. Pat. No. 6,855,076 which claims priority from U.S. Provisional Patent Application No. 60/398,379, filed Jul. 25, 2002 and now abandoned.

STATEMENT REGARDING FEDERALLY SPONSORED RESEARCH OR DEVELOPMENT

Not Applicable

BACKGROUND OF THE INVENTION

1. Field of the Invention

The present invention relates to golf balls, preferably golf balls with a polyurethane, polyurea or polyurethane/polyurea component, such as a cover layer, having improved durability for repetitive play.

2. Description of the Related Art

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short life span.

As a result of this negative property, balata and its synthetic substitutes, transpolybutadiene and transpolyisoprene, have been essentially replaced as the cover materials of choice by other cover materials such as ionomeric resins and polyurethanes.

Ionomeric resins are polymers containing interchain ionic bonding. As a result of their toughness, durability and flight characteristics, various ionomeric resins sold by E.I. DuPont de Nemours & Company under the trademark Surlyn® and by the Exxon Corporation (see U.S. Pat. No. 4,911,451) under the trademarks Escor® and Iotek®, have become widely utilized for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, such as durability, for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are many different commercial grades of ionomers available both from DuPont and Exxon, with a wide range of properties which vary according to the type and amount of metal cations, molecular weight, composition of the base resin (for example, relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (for example, "spin", "feel", etc.) characteristics previously associated with the "soft" balata covers, properties which are still desired by the more skilled golfer.

Furthermore, a number of different golf ball constructions, such as one-piece, two-piece (a solid resilient center or core with a molded cover), three-piece (a liquid or solid center, elastomeric winding about the center, and a molded cover), and multi-piece golf balls, have been developed to produce golf balls exhibiting enhanced playability and durability. The different types of materials utilized to formulate the cores, mantles, windings, covers, etc. of these balls dramatically alters the balls' overall characteristics. In addition, multi-layered covers containing one or more ionomer resins or other materials have also been formulated in an attempt to produce a golf ball having the overall distance, playability and durability characteristics desired.

For example, in various attempts to produce a durable, high spin golf ball, the golfing industry has blended the hard ionomer resins with a number of softer ionomeric resins and applied these blends to two-piece and three-piece golf balls. U.S. Pat. Nos. 4,884,814 and 5,120,791 are directed to cover compositions containing blends of hard and soft ionomeric resins. However, it has been found that golf ball covers formed from hard-soft ionomer blends tend to become scuffed more readily than covers made of hard ionomer alone. Consequently, it would be useful to develop a golf ball having a combination of softness and durability which is better than the softness-durability combination of a golf ball cover made from a hard-soft ionomer blend.

Additionally, thermoset and thermoplastic polyurethanes have recently become popular materials of choice for golf ball cover construction. However, these polyurethanes are difficult and time consuming to process. Moreover, the molding of relatively thin wall cover layer(s), i.e., cover layers 0.075 inches or less in cross-sectional thickness, is difficult to accomplish. This limits the desired performance achieved by thin wall cover molding, such as improved distance. Furthermore, golf balls produced utilizing these materials tend to be soft and readily susceptible to scuffing.

As a result, it would be further desirable to produce a thermoplastic polyurethane covered golf ball having a thin wall cover construction which exhibits enhanced durability, namely improved cut and scuff (groove shear) resistance, while maintaining and/or improving such characteristics as playability and distance.

BRIEF SUMMARY OF THE INVENTION

An object of the invention is to provide a golf ball with a soft, polyurethane, polyurea or polyurethane/polyurea golf ball component having improved durability for repetitive play. Another object of the invention is to provide a method of making such a golf ball.

A further object of the invention is to provide a golf ball with a soft, low flex modulus thermoplastic polyurethane, polyurea or polyurethane/polyurea outer cover component having enhanced durability while maintaining or improving the playability properties of the ball, as well as a method of making the same.

An additional object of the invention is to provide a golf or game ball with a thin, thermoplastic polyurethane, polyurea or polyurethane/polyurea outer cover layer having improved playability, distance and cut resistance. Also included is a process for producing such a ball.

A still further object is to produce a high melt index thermoplastic polyurethane, polyurea or polyurethane/polyurea (TPU) golf ball component, such as the outer cover layer of a golf ball. Preferably, the cover is of thin wall (i.e., 0.075 inches or less, preferably 0.040 inches or less, more preferably 0.030 inches or less and most preferably 0.025 inches or less) construction. A process for producing such a high melt index cover is also included in the present invention.

A still additional object is to produce a molded golf ball component produced from a high melt index, thermoplastic polyurethane, polyurea or polyurethane/polyurea material. The material has a melt index of 15 g/10 min, preferably 20 g/10 min or more, more preferably 25 g/10 min or more at a temperature of 200° C. to 210° C. and a load of 8.7 Kg prior to molding. Subsequent to molding, the molded golf ball component is treated with a secondary surface curing agent, such as an isocyanate solution, to produce a soft, yet durable golf ball component.

Another object of the invention is to produce a golf ball having a core with a relatively thin cover layer molded thereon. The cover layer is produced from a polyurethane, polyurea or polyurethane/polyurea material having a high melt index. The melt index of the material is 15 g/10 min or more, preferably 20 g/10 min or more, and more preferably 25 g/10 min or more, even more preferably 30 g/10 min or more and most preferably 35 g/10 min or more, at a temperature of 200° C. to 210° C. and a load of 8.7 Kg prior to molding. Subsequent to molding, the cover layer of the golf ball is treated with an isocyanate solution. The resulting product exhibits enhanced playability and durability characteristics.

Yet another object is to produce a multi-piece golf ball having a thin, yet soft, outer cover layer. The outer cover layer is molded from a thermoplastic polyurethane, polyurea or polyurethane/polyurea material having a high melt index. The melt index of the material is 15 g/10 min or more, preferably 20 g/10 min or more, and more preferably 25 g/10 min or more, even more preferably 30 g/10 min or more, and most preferably 35 g/10 min or more, at a temperature of 200° C. to 210° C. and a load of 8.7 Kg prior to molding. After the molding step, the cover of the golf ball is subjected to treatment for an effective period of time, with a secondary curing agent, such as an isocyanate solution containing one or more isocyanates to improve the cover's durability. The multi-piece golf ball produced exhibits enhanced characteristics in playability and durability.

Still another object of the invention is to produce a molded golf ball component, such as a molded golf ball cover layer, comprising a thermoplastic material wherein the melt index of the material is increased at least 10%, most preferably 100% or more, prior to molding. The thermoplastic material comprises polyurethane, polyurea or blends thereof. The process of producing such a component is also included herein.

Other objects will be in part obvious and in part pointed out more in detail hereafter.

In this regard, the invention is directed, in part, to a golf ball component produced from a thermoplastic polyurethane, polyurea or polyurethane/polyurea (TPU) material having a high melt index. Alternatively, the golf ball component is produced from a polyurethane, polyurea or polyurethane/polyurea material wherein the melt index of the material is increased approximately 10% or more, preferably 20% or more, more preferably 50% or more, and most preferably 100% or more, prior to molding. Preferably, the component is the outer cover layer of a golf ball, such as a two-piece, three-piece or multi-piece golf ball.

In another aspect, the present invention is directed to the process of producing a thermoplastic polyurethane, polyurea or polyurethane/polyurea golf ball component, the processes comprising the steps of obtaining or producing a thermoplastic polyurethane, polyurea or polyurethane/polyurea material having a high melt index prior to molding. The high melt index material can be produced by converting a low melt index thermoplastic material into a higher melt index material. This is optimally produced by further processing or refining the material. Preferably, the material is refined by lowering the molecular weight of the material such as by mechanical (i.e., extrusion, etc.) and chemical means. However, other mechanisms for increasing the melt index of the material can be utilized. The higher melt index material produced thereby is then molded into a golf ball component such as a cover. The component so produced may also be subsequently treated with a secondary curing agent, such as an isocyanate solution, to enhance the component's durability. The present invention is also directed to the golf ball component produced using such a process.

In a further aspect, the present invention is directed to a process for producing a golf ball having a relatively thin (i.e., 0.075 inches or less, preferably 0.050 inches or less, more preferably 0.040 inches or less) cover comprising a high melt index, thermoplastic polyurethane, polyurea or polyurethane/polyurea (TPU) material. The process comprises the steps of obtaining a base thermoplastic polyurethane, polyurea or polyurethane/polyurea material, increasing the melt index of the base material at least 10% (preferably 20% or more, more preferably 50% or more, and most preferably 100% or more), and molding the increased melt index thermoplastic polyurethane material into a very thin golf ball cover. The very thin golf ball cover is then subsequently treated with a secondary curing agent, such as an isocyanate solution. This produces a relatively soft, very thin cover layer having improved durability. In another aspect, the present invention relates to the golf ball cover produced by this process.

In still another aspect, the present invention relates to a process for producing a high melt index, thermoplastic polyurethane, polyurea or polyurethane/polyurea (TPU) golf component having improved durability. The process comprises the steps of obtaining a base thermoplastic polyurethane, polyurea or polyurethane/polyurea material, increasing the melt index of the base material at least 10% (most preferably about 100% or more), molding the increased melt index thermoplastic material into a golf ball component, and treating the molded golf ball component with an isocyanate solution.

In an additional aspect, the present invention provides a golf ball comprising a core with a cover disposed on the core. The cover includes a polyurethane material having a high melt index of from about 15 g/10 min or more, preferably 20 k/10 min or more, and more preferably 25 to about 150 grams per 10 minutes at a temperature of 200° C. to 210° C. and a load of 8.7 kg prior to molding. The cover is subsequently treated with an isocyanate or a mixture of isocyanates for an effective period of time to enhance its durability.

In another aspect, the present invention provides a golf ball comprising a core with an outer cover disposed on the core. The cover is formed from a polymeric cover composition that includes a polyurethane. The cover composition has a melt index prior to forming the cover of from about 35 to about 85 grams per 10 minutes at a temperature of 200° C. to 210° C. and a load of 8.7 kg. Subsequent to molding, the cover is treated with a secondary curing agent such as an isocyanate solution. The golf ball may also include one or more intermediate layers between the core and the outer cover layer.

In a further aspect, the present invention provides a method for producing a golf ball. The method comprises the steps of providing a core material and forming a core from that core material. A cover material is provided in which the cover material includes a polyurethane, polyurea or polyurethane/polyurea, having a melt index of from about 15 g/10 min or more, preferably 20 g/10 min or more, and more preferably 25 to about 150 grams per 10 minutes at a temperature of 200° C. to 210° C. and a load of 8.7 kg. The method additionally includes the steps of forming a cover layer from the cover material about the core and treating the cover layer with a solution of isocyanates.

In yet another aspect, the present invention provides a method for producing a multi-piece golf ball with a soft, yet durable cover for repetitive play. The method comprises a step of providing a core material and forming a molded core from the core material. The method additionally comprises the step of providing a cover material in which the cover material includes a polyurethane, polyurea or blends thereof having a flex modulus of 30,000 psi or less (plaque), preferably 20,000 or less, and more preferably 15,000 or less, and a Shore D of 60 or less (plaque), preferably 55 or less, more preferably 50 or less and most preferably 45 or less. The cover material exhibits a melt index of from about 15 g/10 min or more, preferably 20 g/10 min or more, and more preferably 25 to about 150 grams per 10 minutes at a temperature of 200° C. to 210° C. and a load of 8.7 kg prior to molding. The method further comprises the steps of molding a cover layer from the cover material about the core and then treating the molded cover layer with an isocyanate solution. This aspect also includes the soft covered, multi-piece golf ball produced by such a process.

In still another aspect, the present invention provides a method of producing a multi-piece golf ball. The method comprises a step of providing a core material, forming a core from that core material, providing a cover material in which the cover material includes a low flex modulus (i.e., having a flex modulus of 30,000 or less (plaque), preferably 20,000 or less, and more preferably 15,000 or less), polyurethane, polyurea or polyurethane/polyurea material in which the melt index of the material has been increased prior to molding at least 10% or more, preferably 20% or more, more preferably 50% or more, and most preferably 100% or more, from supplied base or virgin material to refined or processed material, and molding a cover layer from that material. The method additionally includes a step of applying a solution of one or more isocyanates to the molded cover layer for a time period of from about 1 minute to about 10 minutes.

The invention accordingly comprises the several steps and the relation of one or more of such steps with respect to each of the others and the articles possessing the features, properties, and the relation of elements exemplified in the following detailed disclosure.

BRIEF DESCRIPTION OF THE SEVERAL VIEWS OF THE DRAWINGS

The following is a brief description of the drawings, which are presented for the purposes of illustrating the invention and not for the purposes of limiting the same.

DETAILED DESCRIPTION OF THE INVENTION

Figure 1:
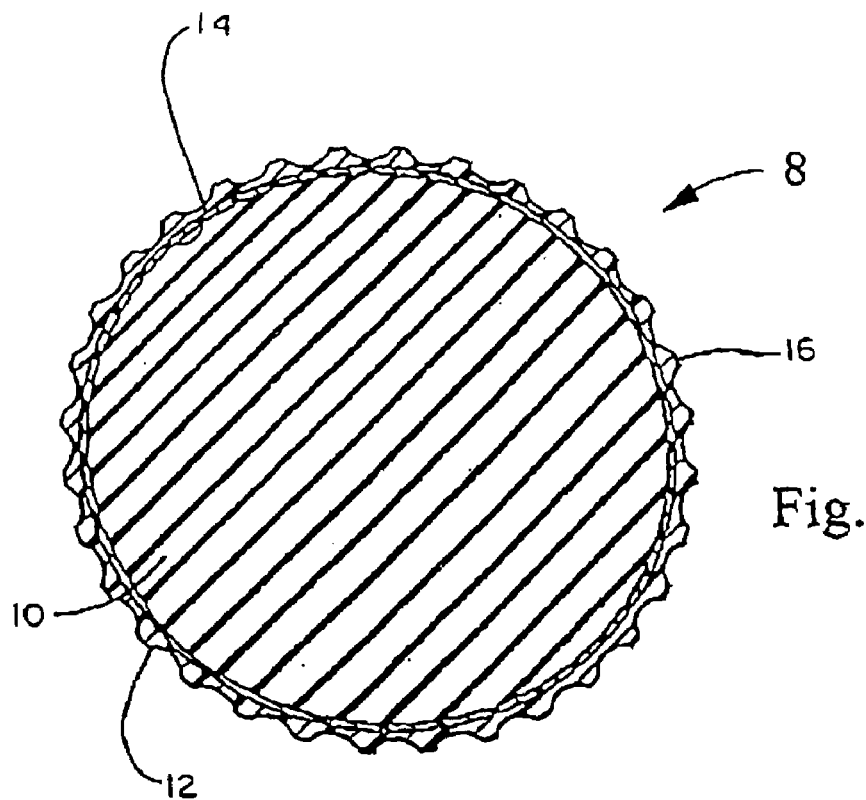
FIG. 1 is a cross-sectional view of a golf ball 8 embodying the invention illustrating a core 10 and a cover 12 consisting of an inner layer 14 and an outer layer 16.

The present invention is directed to a molded golf ball component, such as a golf ball cover layer that is comprised of a soft, high melt index thermoplastic polyurethane, polyurea or polyurethane/polyurea material. Preferably, the golf ball component comprises a relatively thin (i.e., 0.075 inches or less, preferably 0.050 inches or less, more preferably 0.040 inches or less, even more preferably 0.030 inches or less, and most preferably 0.025 inches or less) outer cover layer. The golf ball component can then be optionally exposed to a secondary curing, cross-linking or treating agent, such as a solution of isocyanate, to improve certain characteristics (such as durability, etc.) of the resulting molded component.

Along these lines, the present invention concerns the production of a thermoplastic polyurethane, polyurea or polyurethane/polyurea golf ball component wherein the melt index of polyurethane, polyurea or polyurethane/polyurea material is high (i.e., 15 g/10 min or more, preferably 20 g/10 min or more, more preferably greater than 25 grams per 10 minutes at the temperature of 200° C. to 210° C. and a load of 8.7 Kg) or substantially increased prior to molding. For example, the melt index of the material can be increased, from supplied or base material to refined or processed material, at least 10% or more, preferably 20% to 720%, more preferably 50% to 720%, and most preferably 100% or more prior to molding.

The enhanced melt index of the material may be achieved by secondary processing or refining steps, such as by mechanical, chemical or electrical means. Preferably, the melt index is increased by mechanical means such as by extrusion. While not wanting to be limited to the theory of such an increase, it is believed that the melt index increases after extrusion due to a decrease in molecular weight, either by mechanical shearing or chemical changes or both. Additional processes for decreasing the molecular weight of the material can also be used. For example, other methods for decreasing the molecular weight and/or increasing the melt index of the material include the use of, or the incorporation of, heat, light, irradiation, moisture, flow additives, plasticizers, extenders, lubricants or other thermoplastic materials having a higher melt index, etc. The melt index of the material is adjusted to the high melt index range desired prior to molding.

In a further embodiment, the golf ball component, such as a golf ball cover, is treated with a secondary curing or treating agent, such as a solution containing one or more isocyanates, to improve durability of the component. It is believed that the isocyanate further cross-links the cover material to provide additional scuff resistance while maintaining the other desirable features of the cover, such as softness and feel. The solution containing the isocyanate is added to the outer cover layer by any suitable method known in the art, although dipping, wiping, soaking, brushing or spraying the golf ball in or with the isocyanate solution is preferred. The method of adding the isocyanate to the cover layer is discussed in more detail below.

The solution of the isocyanate that is added to the cover layer to improve scuff resistance can be any aliphatic or aromatic isocyanate or diisocyanate or blends thereof known in the art. The isocyanate or diisocyanate used may have a solids content in the range of about 1 to about 100 weight %, preferably about 5 to about 50 weight %, most preferably about 10 to about 30 weight %. If it is necessary to adjust the solids content, any suitable solvent that will allow penetration of the isocyanate into the polyurethane, polyurea or polyurethane/polyurea cover material without causing distortion may be used. Examples of suitable solvents include ketone and acetate.

In a particularly preferred aspect of the present invention, the cover layer is relatively thin (i.e., 0.075 inches or less) and is formed from a thermoplastic polyurethane, polyurea or polyurethane/polyurea material having a relatively high melt index, or that which is adjusted prior to molding so as to exhibit a relatively high melt index. In this regard, the melt of the material is 25 g/10 min or more at a temperature of 200° C. to 210° C. and a load of 8.7 kg prior to molding. Preferably, the melt index of the material is of 30 g/10 min or more, more preferably 35 g/10 min or more and most preferably 40 g/10 min or more at the above noted temperature and conditions.

In accordance with the present invention, it has been discovered that the higher the melt index of a polymer, the better the flow and lower the injection molding pressures, and thus, the greater the ability to mold thin cross sections. If the melt index values were not adjusted higher in this fashion, thin wall cover molding would not be possible with certain materials, thereby limiting the performance achieved by thin wall cover molding (mainly improved distance). Melt index or melt flow values referred to herein are determined (unless specified differently) in accordance with ASTM Standard D1238, herein incorporated by reference.

The previously noted preferred thermoplastic polyurethane materials may be adjusted into higher melt index materials prior to their use as golf ball cover materials. It is necessary to raise melt index to allow for the molding of a relatively thin wall cover over golf ball cores (i.e., covers less than 0.075). For example, Bayer Texin® DP7-1097 has (according to Bayer Corporation) a melt index of about 7 to 12 g/10 min at 200° C. and 8.7 kg. The base material received from Bayer is then further processed to exhibit a melt index of from about 25 to about 45 g/10 min at 200° C. and 8.7 kg. This material, when used for forming a golf ball cover layer as described herein and including white masterbatch material, preferably has an increased melt index of about 35 to about 85 g/10 min at 200° C. and 8.7 kg.

Similarly, Bayer Texin® 245 has (according to Bayer Corporation) a melt index of about 20 to 40 g/10 min at 230° C. and 1.2 kg. It can be further processed or refined to exhibit a melt index of about 25 to about 45 g/10 min at 210° C. and 8.7 kg. Additionally, the melt index of the material can be further adjusted by adding white masterbatch so the melt index is about 35 to about 85 g/10 min at 210° C. and 8.7 kg prior to molding.

As also noted herein, it has been discovered that as the melt index of a polymer increases, some of the physical properties of the polymer decrease. As a result, in the more preferred embodiments of the invention the high melt index golf ball components are further treated with a liquid isocyanate solution. By performing an isocyanate post-molding treatment process to the golf ball, the physical properties of the thermoplastic polyurethane, polyurea or polyurethane/polyurea cover material may not only increase, but may increase beyond the values of the non-refined material. This physical property improvement yields a significant improvement in golf ball durability, namely improved cut and scuff (groove shear) resistance.

This post-application of isocyanate is believed to allow for the use of relatively high melt index thermoplastic polyurethane, polyurea or polyurethanes/polyureas to be used in conventional injection molding machines and/or in reaction injection molding ("RIM") equipment to mold thin wall layers, i.e. 0.075 inches, more preferably 0.050 inches and below, preferably 0.040 inches and below, more preferably 0.030 inches and below, and most preferably 0.025 inches and below. The molded thin-walled golf balls are preferably dipped in an isocyanate solution for 1 to 10 minutes (preferably 1 to 5 minutes); the isocyanate may be aliphatic or aromatic, such as HDI, IPDI, MDI, TDI type or others as discussed below and the isocyanate solution may range from 10 to 100% solids. The solvent used to reduce the solids and make the isocyanate solutions may be a ketone or acetate or any solvent that will allow penetration of the isocyanate into the cover material without distorting the cover. After dipping, the balls are air-dried for 1 hour and then post-cured at 175° F. for 4 hours. After the post-cure the balls may be cleaned with isopropanol to remove any excess isocyanate from the cover and the balls are then finished in a normal manner. Preferably, the isocyanate used is of the MDI type at 15–30% solids reduced with a ketone (such as Mondur ML™ from Bayer Corporation) and dipped for 2–3 minutes. Most preferably, the solids level is about 16 to 24% (20±4). It is beneficial that the MDI remain in a liquid state at room temperature. However, this method shall not be limited to the type of polyurethane, polyurea or polyurethane/polyurea material, isocyanate used, concentration of the isocyanate solution, solvent used, dip time, or method of application described above.

The cover is preferably a multi-layer cover comprising a harder inner cover layer formed over the core, the inner cover layer having a Shore D hardness of at least 60 (or at least about 80 Shore C) as measured on the surface thereof, and a softer outer cover layer comprising thermoplastic polyurethane, polyurea or polyurethane/polyurea formed over the inner cover layer, the outer cover layer having a Shore D hardness of less than 60, preferably a Shore D hardness of 55 or less, more preferably 50 or less, and most preferably 45 or less, as measured on the surface thereof, the golf ball cover having improved scuff resistance. The cover may optionally comprise additional layers. In such a golf ball, the present invention is directed, in part, to the process of producing the soft, outer cover layers.

In another aspect, the present invention provides a golf ball comprising a core, a hard inner cover layer formed over the core, and a softer outer cover layer formed over the inner cover layer. The inner cover layer has a Shore D hardness of at least 60 (or at least about 80 Shore C) as measured on the curved surface thereof and is formed of a composition including at least one material selected from the group of consisting of ionomers, polyamides, polyurethanes, polyureas, polyester elastomers, polyester amides, metallocene catalyzed polyolefins, and blends thereof. The outer cover layer has a Shore D hardness of less than 60, preferably a Shore D hardness of 55 or less, more preferably 50 or less, and most preferably 45 or less as measured on the curved surface thereof. It is formed from a composition comprising at least one thermoplastic polyurethane, polyurea or polyurethane/polyurea material having an increased melt index. The golf ball cover has improved scuff resistance.

Figure 2:
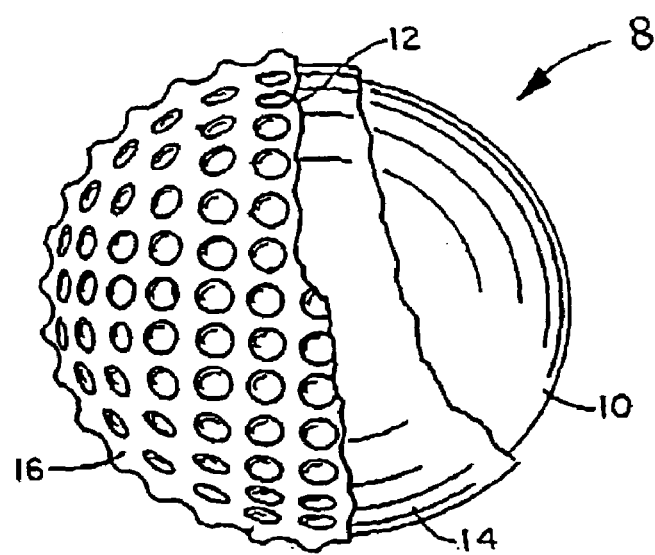
FIG. 2 is a diametrical cross-sectional view of a golf ball 8 of the invention having a core 10 and a cover 12 made of an inner layer 14 and an outer layer 16.
Figure 3:
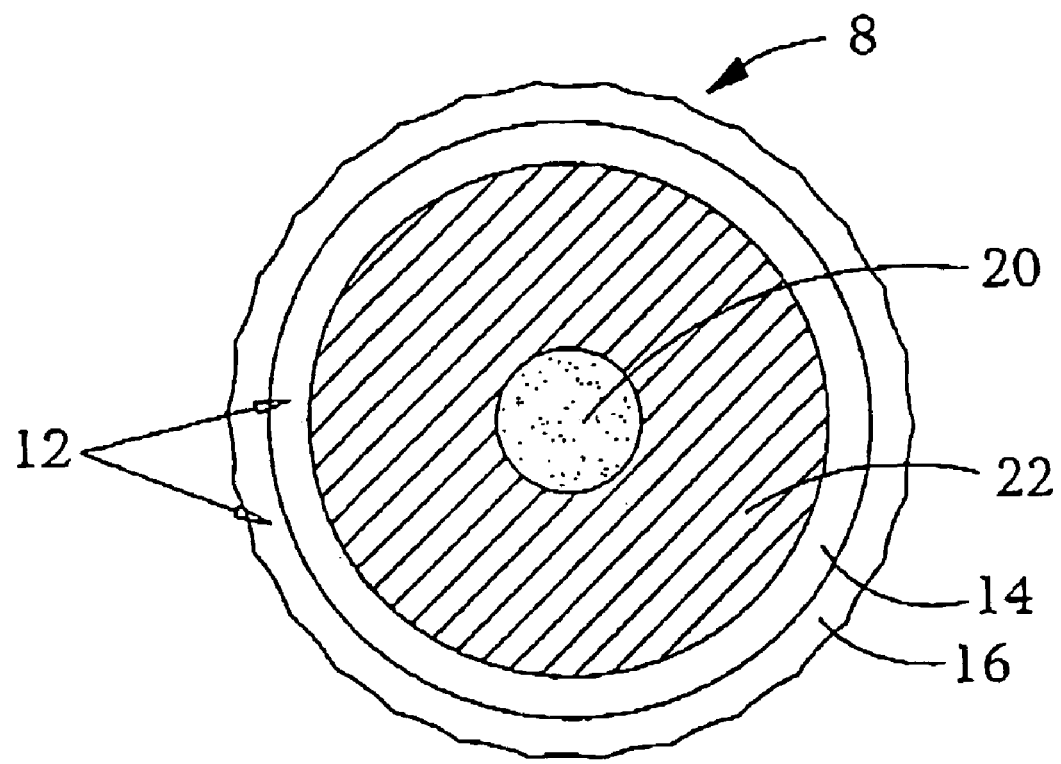
FIG. 3 is a cross-sectional view of a golf ball 8 embodying the invention illustrating a dual core having an inner core 20 and a core layer 22, and a cover 12 consisting of an inner layer 14 and an outer layer 16.

Referring to the FIGS. 1–3, the present invention relates to improved multi-layer golf balls, particularly a golf ball 8 comprising a multi-layered cover 12 over a solid core 10, and method for making same. The golf balls of the invention can be of a standard or enlarged size, and the outer cover layer has improved scuff resistance. The core may have multiple layers, such as a dual core as shown in FIG. 3 having a spherical center or inner core 20 and a core layer 22 surrounding the inner core. Additional core layers may also be present. The cover layer is preferably a multi-layer cover comprising at least an inner cover layer and an outer cover, although any number of cover layers, such as 2, 3, 4, 5 or more is possible.

The core 10, or the dual core 20, 22, of the golf ball can be formed of a solid, a liquid, or any other substance that will result in an inner ball (core and inner cover layer), having the desired COR, compression and hardness. The multi-layered cover 12 comprises two layers: a first or inner layer or ply 14 and a second or outer layer or ply 16. The inner layer 14 can be ionomer, ionomer blends, non-ionomer, non-ionomer blends, or blends of ionomer and non-ionomer. The outer layer 16 is preferably softer than the inner layer and can be polyurethane, polyurea, polyurethane/polyurea blends, or a blend of a polyurethane/polyurea and ionomer or non-ionomer.

In a further embodiment, the inner layer 14 is comprised of a hard, high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In an additional embodiment, the inner layer 14 is comprised of a hard, low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt.

It has been found that a hard inner layer provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the clubface and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving, the playability properties of the ball.

The combination of a hard inner cover layer or layers with a soft, relatively low modulus polyurethane, polyurea or polyurethane/polyurea outer cover layer provides for excellent overall coefficient of restitution (for example, excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

The particular parameters of the various components of the golf balls, as well as the methods for making the same are more specifically set forth below.

Inner Cover Layer(s)

Preferably, the inner cover layer is harder than the outer cover layer and generally has a thickness in the range of 0.010 to 0.150 inches, preferably 0.010–0.100 inches, more preferably 0.020 to 0.060 inches for a 1.68 inch ball and 0.030 to 0.100 inches for a 1.72 inch (or more) ball. The core and inner cover layer together form an inner ball having a coefficient of restitution of 0.780 or more and more preferably 0.790 or more, and a diameter in the range of 1.48 to 1.67 inches for a 1.68 inch ball and 1.50 to 1.71 inches for a 1.72 inch (or more) ball. The inner cover layer has a Shore D hardness of 60 or more (or at least about 80 Shore C). It is particularly advantageous if the golf balls of the invention have an inner layer with a Shore D hardness of 65 or more (or at least about 100 Shore C). If the inner layer is too thin, it is very difficult to accurately measure the Shore D, and sometimes the Shore C, of the inner layer as the layer may puncture. Additionally, if the core is harder, this will sometimes influence the reading. If the Shore C or Shore D is measured on a plaque of material, different values will result. The above-described characteristics of the inner cover layer provide an inner ball having a PGA compression of 100 or less. It is found that when the inner ball has a PGA compression of 90 or less, excellent playability results.

The inner layer compositions of the embodiments described herein may include the high acid ionomers such as those developed by E.I. DuPont de Nemours & Company under the trademark Surlyn® and by Exxon Corporation under the trademarks Escor® or Iotek®, or blends thereof.

The high acid ionomers which may be suitable for use in formulating the inner layer compositions of various embodiments of the invention are ionic copolymers which are the metal, (such as sodium, zinc, magnesium, etc.), salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

The high acid ionomeric resins available from Exxon under the designation Escor® or Iotek®, are somewhat similar to the high acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® 8220 and 8240 (both formerly known as forms of Surlyn® AD-8422), Surlyn® 9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

Examples of the high acid acrylic acid based ionomers suitable for use in the present invention also include the Escor® or Iotek® high acid ethylene acrylic acid ionomers produced by Exxon such as Ex 1001, 1002, 959, 960, 989, 990, 1003, 1004, 993, 994. In this regard, Escor® or Iotek® 959 is a sodium ion neutralized ethylene-acrylic neutralized ethylene-acrylic acid copolymer. According to Exxon, Ioteks® 959 and 960 contain from about 19.0 to about 21.0% by weight acrylic acid with approximately 30 to about 70 percent of the acid groups neutralized with sodium and zinc ions, respectively.

Furthermore, as a result of the development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are now available for golf ball cover production. It has been found that these additional cation neutralized high acid ionomer blends produce inner cover layer compositions exhibiting enhanced hardness and resilience due to synergies that occur during processing. Consequently, the metal cation neutralized high acid ionomer resins recently produced can be blended to produce substantially higher C.O.R.'s than those produced by the low acid ionomer inner cover compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, now U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the Primacor® designation.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The metal cation neutralized high acid ionomer resins are produced by reacting the high acid base copolymer with various amounts of the metal cation salts above the crystalline melting point of the copolymer, such as at a temperature from about 200 EF to about 500 EF, preferably from about 250 EF to about 350 EF under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

A number of different types of metal cation neutralized high acid ionomers can be obtained from the above-indicated process. These include high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several cation neutralized acrylic acid based high acid ionomer resins are produced.

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (for example, the inner cover layer or layers herein) the resulting golf balls will travel further than previously known multi-layered golf balls produced with low acid ionomer resin covers due to the balls' enhanced coefficient of restitution values.

Alternatively, if the inner cover layer comprises a low acid, the low acid ionomers which may be suitable for use in formulating the inner layer compositions of the subject invention are ionic copolymers which are the metal, (sodium, zinc, magnesium, etc.), salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10 to 100%, preferably 30 to 70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E.I. DuPont de Nemours & Company under the trademark Surlyn® and by Exxon Corporation under the trademarks Escor® or Iotek®, or blends thereof. The low acid ionomer resins available from Exxon under the designation Escor® and/or Iotek®, are somewhat similar to the low acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (for example, the inner cover layer herein) the resulting golf balls will travel further and at an enhanced spin rate than previously known multi-layered golf balls. Such an improvement is particularly noticeable in enlarged or oversized golf balls.

In one embodiment of the inner cover layer, a blend of high and low acid ionomer resins is used. These can be the ionomer resins described above, combined in a weight ratio which preferably is within the range of 10 to 90 to 90 to 10 high and low acid ionomer resins.

Another embodiment of the inner cover layer is primarily or fully non-ionomeric thermoplastic material. Suitable non-ionomeric materials include metallocene catalyzed polyolefins or polyamides, polyamide/ionomer blends, polyphenylene ether/ionomer blends, etc., which have a Shore D hardness of at least 60 (or at least about 80 Shore C) and a flex modulus of greater than about 15,000, more preferably about 30,000 psi, or other hardness and flex modulus values which are comparable to the properties of the ionomers described above. Other suitable materials include but are not limited to thermoplastic or thermosetting polyurethanes, thermoplastic block polyesters, for example, a polyester elastomer such as that marketed by DuPont under the trademark Hytrel®, or thermoplastic block polyamides, for example, a polyether amide such as that marketed by Elf Atochem S.A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

A golf ball inner cover layer according to the present invention formed from a polyurethane material typically contains from about 0 to about 60 weight percent of filler material, more preferably from about 1 to about 30 weight percent, and most preferably from about 1 to about 20 weight percent.

Outer Cover Layer

While the core with the hard inner cover layer formed thereon provides the multi-layer golf ball with power and distance, the outer cover layer 16 is preferably comparatively softer than the inner cover layer. The softness provides for the feel and playability characteristics typically associated with balata or balata-blend balls. The outer cover layer or ply is comprised of a relatively soft, low modulus (about 1,000 psi to about 30,000 psi, preferably about 5,000 psi to about 20,000) polyurethane, polyurea or polyurethane/polyurea, or a blend of two or more polyurethanes, or a blend of one or more ionomers or one or more non-ionomeric thermoplastic materials with a polyurethane, preferably a thermoplastic polyurethane. The outer layer is 0.005 to about 0.150 inches in thickness, preferably 0.010 to 0.075 inches in thickness, more desirably 0.015 to 0.050 inches in thickness, but thick enough to achieve desired playability characteristics while minimizing expense. Thickness is defined as the average thickness of the non-dimpled areas of the outer cover layer. The outer cover layer 16 has a Shore D hardness of less than 60 (or less than about 90 Shore C), and more preferably 55 or less (or about 85 to 88 Shore C or less). If the outer layer is too thin, it is very difficult to accurately measure the Shore D, and sometimes the Shore C, of the outer layer as the layer may puncture. Additionally, if the inner layer and/or core is harder than the outer layer, this will sometimes influence the reading. If the Shore C or Shore D is measured on a plaque of material, different values may result.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

In a preferred embodiment, the outer cover layer comprises a polyurethane, a polyurea or a blend of polyurethanes/polyureas. Polyurethanes/polyureas are polymers that are used to form a broad range of products. They are generally formed by mixing two primary ingredients during processing. For the most commonly used polyurethanes, the two primary ingredients are a polyisocyanate (for example, diphenylmethane diisocyanate monomer ("MDI") and toluene diisocyanate ("TDI") and their derivatives) and a polyol (for example, a polyester polyol or a polyether polyol). Various chain extenders, known in the art, are also commonly used.

A wide range of combinations of polyisocyanates and polyols, as well as other ingredients, are available. Furthermore, the end-use properties of polyurethanes can be controlled by the type of polyurethane utilized, such as whether the material is thermoset (cross-linked molecular structure) or thermoplastic (linear molecular structure).

Cross-linking occurs between the isocyanate groups (—NCO) and the polyol's hydroxyl end-groups (—OH), and/or with already formed urethane groups. Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM") or may be on the order of several hours or longer (as in several coating systems). Consequently, a great variety of polyurethanes are suitable for different end-uses.

Polyurethanes are typically classified as thermosetting or thermoplastic. A polyurethane becomes irreversibly "set" when a polyurethane prepolymer is cross-linked with a polyfunctional curing agent, such as a polyamine or a polyol. The prepolymer typically is made from polyether or polyester. Diisocyanate polyethers are typically preferred because of their hydrolytic properties.

The physical properties of thermoset polyurethanes are controlled substantially by the degree of cross-linking. Tightly cross-linked polyurethanes are fairly rigid and strong. A lower amount of cross-linking results in materials that are flexible and resilient. Thermoplastic polyurethanes have some cross-linking, but primarily by physical means. The cross-link bonds can be reversibly broken by increasing temperature, as occurs during molding or extrusion. In this regard, thermoplastic polyurethanes can be injection molded, and extruded as sheet and blow film. They can be used up to about 350° F. to 450° F. and are available in a wide range of hardnesses.

Polyurethane materials suitable for the present invention are formed by the reaction of a polyisocyanate, a polyol, and optionally one or more chain extenders. The polyol component includes any suitable polyether- or polyester-polyol. Additionally, in an alternative embodiment, the polyol component is polybutadiene diol. The chain extenders include, but are not limited to, diols, triols and amine extenders. Any suitable polyisocyanate may be used to form a polyurethane according to the present invention. The polyisocyanate is preferably selected from the group of diisocyanates including, but not limited, to 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis(isocyanato methyl)cyclohexane; and polymethylene polyphenyl isocyanate ("PMDI").

One polyurethane component that can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The polyurethane, polyurea or polyurethane/polyurea which is selected for use as a golf ball cover preferably has a Shore D hardness of from about 10 to about 60, more preferably from about 25 to about 60, and most preferably from about 30 to about 55 for a soft cover layer. The polyurethane, polyurea or polyurethane/polyurea which is to be used for a cover layer preferably has a flex modulus from about 1 to about 310 Kpsi, more preferably from about 5 to about 100 Kpsi, and most preferably from about 5 to about 20 Kpsi for a soft cover layer and 30 to 70 Kpsi for a hard cover layer. Accordingly, covers comprising these materials exhibit similar properties. The polyurethane preferably has good light fastness.

Non-limiting examples of a polyurethane, polyurea or polyurethane/polyurea suitable for use in the outer cover layer include a thermoplastic polyester polyurethane such as Bayer Corporation's Texin® polyester polyurethane (such as Texin® DP7-1097, Texin® 285 and Texin® 245 grades). Optionally, the thermoplastic polyurethane material may also be blended with a soft ionomer or other ionomeric and non-ionomeric polymeric fillers or additive materials. For example, polyamides blend well with soft ionomer.

According to Bayer Corporation, Texin® DP7-1097 has the following properties:

TABLE 1

Properties of Texin ® DP7-1097

| | |
|---|---|
| Tensile Strength (ASTM D412) | 6000 lb/in$^2$ |
| @50% (ASTM D412) | 875 lb/in$^2$ |
| @200% (ASTM D412) | 950 lb/in$^2$ |
| @300% (ASTM D412) | 2200 lb/in$^2$ |
| Ultimate Elongation (ASTM D412) | 450% |
| Flexural Modulus (ASTM D790) | |
| 158° F. (70° C.) | 3841 lb/in$^2$ |
| 73° F. (23° C.) | 6500 lb/in$^2$ |
| −22° F. (−30° C.) | 57400 lb/in$^2$ |
| Hardness (Shore A/Shore D) | 90/40 |
| Bayshore Resilience (ASTM D2632) | 35% |
| Solubility in Water | Insoluble |
| Tear Strength, Die "C" (ASTM D624) | 600 lbf/in |
| Specific Gravity (ASTM D792) | 1.20 |
| Vicat Softening Temp. (ASTM D1525) | 216° F. |
| Melt Index | 7–14 g/10 min at 200° C. and 8.7 kg, L/D = 4 (Method 1103-A) |

According to Bayer Corporation, Texin® 245 has the following properties:

TABLE 2

Properties of Texin ® 245

| | |
|---|---|
| Melt Flow | 20–40 (230° C., 1.2 kg load) |
| Hardness | 40–50 D |
| Tensile Strength | 4000 psi Minimum |
| 100% Modulus | 1090–1400 psi |

The melt indexes of the base thermoplastic polyurethanes received from Bayer Corporation are then increased to the following specifications:

TPU Melt Index ("MI") Specifications

A. DP7-1097
As received from Bayer Corporation: 7–14, measured at 200 C, 8.7 kg. load
"Refined" or extruded specification: 30–50, measured at 200 C, 8.7 kg. load
% flow increase: 114%–614%

B. Texin 245
As received from Bayer Corporation: 20–40, measured at 230 C, 1.2 kg. load
"Refined" specification: 30–50, measured at 210 C, 8.7 kg. load
% flow increase: Approximately 100%

General TPU Extrusion Conditions dry material below 0.03% moisture
single screw extruder, with a single stage screw having an L/D of at least 24:1 and a compression ratio of 3:1
processing temps.
  hopper: 180–220 F
  rear: 360–390 F
  middle: 360–400 F
  front: 360–410 F
  adapter: 365–410 F
  die: 370–415 F
  melt: 385–465 F
cushion—0.125" max.
back pressure—200 psi. max.
screw speed—40–80 rpm
screen packs—optional Procedure for Raising Melt Index ("M.I.") to Desired Refined Specification of 30–50

1. Measure M.I. of dried material as received from Bayer Corporation;
2. Adjust extruder machine settings to achieve a nominal M.I. 40, measured at the appropriate test conditions for either DP7–1097 or Texin 245; and
3. Periodically check the M.I. throughout the extrusion run to ensure a target M.I. value of 40.

When used for golf ball cover compositions, the referenced thermoplastic polyurethane material is blended with masterbatch ("MB"), the blend includes the refined thermoplastic polyurethane material (81% of the final blend) plus a white masterbatch (19% of the final blend) is as follows:
  Refined DP7-1097(81%)+MB (19%)=35–85 at 200 C, 8.7 kg. (w/o MB, the refined material M.I. is 30–50).
  Refined Texin 245(81%)+MB (19%)=35–85 at 210 C, 8.7 kg. (w/o MB, the refined material M.I. is 30–50)

As noted, the melt index of the final blends containing MB increase, due in part to the package additives. These additives tend to act like plasticizers, causing an increase in the melt index. The masterbatch (MB) formulas are as follows:

TPU White Masterbatch Formulation (Texin DP7-1097)

| DESCRIPTION | GRAMS |
|---|---|
| UV PACKAGE | 4.038 |
| AO PACKAGE | 399.32 |
| TRONOX 110/KEMIRA 110 | 11.923 |
| ULTRA BLUE PIGMENT | 200.52 |
| TEXIN DP7-1097 | 83.376 |

TPU White Masterbatch Formulation (Texin 245)

| DESCRIPTION | GRAMS |
|---|---|
| UV PACKAGE | 4.038 |
| AO PACKAGE | 399.32 |
| TRONOX 110/KEMIRA 110 | 11.923 |
| ULTRA BLUE PIGMENT | 401.02 |
| TEXIN 245 | 83.159 |

Other soft, relatively low modulus non-ionomeric thermoplastic polyurethanes may also be utilized to produce the outer cover layers as long as the non-ionomeric materials exhibit the desired high or enhanced melt indexes and produce the playability and durability characteristics desired. These include, but are not limited to thermoplastic polyurethanes such as the Pellethane® thermoplastic polyurethanes from Dow Chemical Co.

Typically, there are two classes of thermoplastic polyurethane materials: aliphatic polyurethanes and aromatic polyurethanes. The aliphatic materials are produced from a polyol or polyols and aliphatic isocyanates, such as H$_{12}$MDI or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light. Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes are typically lower cost than aliphatic polyurethanes.

Other suitable polyurethane materials for use in the present invention golf balls include reaction injection molded ("RIM") polyurethanes. RIM is a process by which highly reactive liquids are injected into a closed mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as polyether—or polyester—polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

Non-limiting examples of suitable RIM systems for use in the present invention are Bayflex® elastomeric polyurethane RIM systems, Baydur® GS solid polyurethane RIM systems, Prism® solid polyurethane RIM systems, all from Bayer Corp. (Pittsburgh, Pa.), Spectrim® reaction moldable polyurethane and polyurea systems from Dow Chemical USA (Midland, Mich.), including Spectrim® MM 373-A (isocyanate) and 373-B (polyol), and Elastolit® SR systems from BASF (Parsippany, N.J.). Preferred RIM systems include Bayflex® MP-5000 and Bayflex® 110–50, filled and unfilled. Further preferred examples are polyols, polyamines and isocyanates formed by processes for recycling polyurethanes and polyureas. Additionally, these various systems may be modified by incorporating a butadiene component in the diol agent.

Another embodiment is a golf ball in which at least one of the inner cover layer and/or the outer cover layer comprises a fast-chemical-reaction-produced component. This component comprises at least one material selected from the group consisting of polyurethane, polyurea, polyurethane ionomer, epoxy, and unsaturated polyesters, and preferably comprises polyurethane. A particularly preferred form of the invention is a golf ball with a cover comprising polyurethane.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

A golf ball outer cover layer according to the present invention formed from a polyurethane material typically contains from about 0 to about 20 weight percent of filler material, more preferably from about 1 to about 10 weight percent, and most preferably from about 1 to about 5 weight percent.

Moreover, in alternative embodiments, either the inner and/or the outer cover layer may also additionally comprise up to 100 wt % of a soft, low modulus, non-ionomeric thermoplastic or thermoset material. Non-ionomeric materials are suitable so long as they produce the playability and durability characteristics desired without adversely affecting the enhanced travel distance characteristic produced by the high acid ionomer resin composition. These include but are not limited to styrene-butadiene-styrene block copolymers, including functionalized styrene-butadiene-styrene block copolymers, styrene-ethylene-butadiene-styrene (SEBS) block copolymers such as Kraton® materials from Shell Chem. Co., and functionalized SEBS block copolymers; metallocene catalyzed polyolefins; ionomer/rubber blends such as those in Spalding U.S. Pat. Nos. 4,986,545; 5,098,105 and 5,187,013; silicones; and Hytrel® polyester elastomers from DuPont and Pebax® polyetheramides from Elf Atochem S.A. A preferred non-ionomeric material suitable for the inner and/or outer cover layer includes polyurethane.

Additional materials may also be added to the inner and outer cover layer of the present invention as long as they do not substantially reduce the playability properties of the ball. Such materials include dyes (for example, Ultramarine Blue™ sold by Whittaker, Clark, and Daniels of South Plainsfield, N.J.) (see U.S. Pat. No. 4,679,795); pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

In a preferred embodiment, the outer cover layer additionally comprises one or more isocyanates to improve the scuff resistance of the outer cover layer. The isocyanate further cross-links the cover material to provide additional scuff resistance while maintaining the other desirable features of the cover, such as softness and feel. The isocyanate is added to the outer cover layer by any suitable method known in the art, although dipping, wiping, soaking, brushing or spraying the golf ball in or with the isocyanate is preferred. The method of adding the isocyanate, or mixtures thereof, to the cover layer is discussed in more detail below.

The isocyanate that is added to the cover layer to improve scuff resistance can be any aliphatic or aromatic isocyanate or diisocyanate or blends thereof known in the art. Examples of suitable isocyanates include, but are not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI"). Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis(isocyanato methyl)cyclohexane; polymethylene polyphenyl isocyanate ("PMDI"); and meta-tetramethylxylylene diisocyanate ("TMXDI"). Preferably, the diisocyanate is MDI. The term "isocyanate" as used herein includes all of these compounds and other isocyanates.

As mentioned generally above, the isocyanate or diisocyanate used may have a solids content in the range of about 1 to about 100 weight %, preferably about 5 to about 50 weight %, most preferably about 10 to about 30 weight %. If it is necessary to adjust the solids content, any suitable solvent (such as ketone and acetate) that will allow penetration of the isocyanate into the polyurethane cover material without causing distortion may be used.

More preferably, the isocyanate utilized is Mondur ML™, an aromatic diisocyanate manufactured by the Bayer Corporation. According to Bayer, Mondur ML™ is an isomer mixture of diphenyl methane diisocyanate (MDI) containing a high percentage of 2,4 isomer. More particularly, Mondur ML™ reportedly has the following specifications and proportions:

or lightly cured elastomer composition comprising a high cis content polybutadiene and a metal salt of an $\alpha$, $\beta$, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layers, the thread wound core may be further treated or coated with an adhesive layer, protective layer, or any substance that may improve the integrity of the wound core during application of the cover layers and ultimately in usage as a golf ball.

Method of Making Golf Ball

In preparing golf balls in accordance with the present invention, an inner cover layer, preferably a hard inner cover

| A. PRODUCT SPECIFICATIONS | | | |
|---|---|---|---|
| Assay, wt. % | 99.5 minimum | 2',4' isomer content, % | 50–60 |
| Acidity as HCl, ppm | 30 maximum | Dimer, wt. % | 0.3 maximum |
| B. TYPICAL PROPERTIES* | | | |
| Appearance | Clear to light yellow liquid | Specific Gravity @ 25° C. | 1.19 |
| Equivalent weight | 125 | Freezing point | 59°–68° F. (15–20° C.) |
| NCO Content, % | 33.4–33.6 | Flash point (Setaflash) | 388° F. (198° C.) |
| Viscosity @25° C., mPa*s | 10 | Equivalent wt., avg. (as supplied) | 125 |
| Weight per gallon, lb. @25° C. | 9.9 | | |

*These items are provided as general information only. They are approximate values and are not considered part of the product specification.

Core

The cores of the inventive golf balls typically have a coefficient of restitution of about 0.750 or more, more preferably 0.770 or more and a PGA compression of about 90 or less, and more preferably 70 or less. Furthermore, in some applications it may be desirable to provide a core with a coefficient of restitution of about 0.780 to 0.790 or more. The core used in the golf ball of the invention preferably is a solid. The term "solid cores" as used herein refers not only to one piece cores but also to those cores having a separate solid layer beneath the covers and over the central core. The cores have a weight of 25–40 grams and preferably 30–40 grams. When the golf ball of the invention has a solid core, this core can be compression molded from a slug of uncured layer, is molded (for example, by injection molding or by compression molding) about a core (preferably a solid core). A comparatively softer outer layer is molded (for example, by injection molding or by reaction injection molding) over the inner layer.

The solid core for the multi-layer ball is about 1.2 to 1.6 inches in diameter, although it may be possible to use cores in the range of about 1.0 to 2.0 inches. Conventional solid cores are typically compression or injection molded from a slug or ribbon of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

In some embodiments, the inner cover layer(s) that is molded over the core is about 0.010 inches to about 0.150 inches in thickness, more preferably about 0.020 to about 0.10 inches thick. The inner ball that includes the core and inner cover layer(s) preferably has a diameter in the range of 1.25 to 1.64 inches. The outer cover layer is 0.005 inches to 0.075 inches in thickness, preferably 0.010 to 0.050 inches thick, more preferably 0.010 to 0.040 inches thick, and most preferably 0.010 to 0.030 inches thick. Together, the core, the inner cover layer(s) and the outer cover layer combine to form a ball having a diameter of 1.680 inches or more, the minimum diameter permitted by the rules of the United States Golf Association and weighing no more than 1.62 ounces.

In a particularly preferred embodiment of the invention, the golf ball has a dimple pattern that provides dimple coverage of 65% or more, preferably 75% or more, and more preferably 85% or more. In a preferred embodiment of the invention, there are greater than 300 dimples, preferably from about 300 to about 500 dimples.

After the outer cover layer, formed from a polyurethane/polyurea material, is molded on the golf ball, the isocyanate is added to the cover. The isocyanate is preferably added by dipping, soaking or spraying the golf ball in or with the isocyanate solution for about 1 to 10 minutes, more preferably about 1 to 5 minutes. If the golf ball is treated too long, the cover could swell and possibly delaminate. The isocyanate solution may be any desired isocyanate or diisocyanate solution, and the solids content is preferably 1 to 100 weight percent, preferably 5 to 50 weight percent, more preferably 15 to 30 weight percent, and most preferably 16 to 24 weight percent. The golf balls are preferably heated to a temperature such as 110° F. to 120° F. before adding the isocyanate to facilitate the penetration of the isocyanate into the cover, although heating is not required. After the golf balls of the invention are dipped in the isocyanate solution for the appropriate amount of time, the balls are air dried for approximately 30 minutes to 24 hours, more preferably 1 to 2 hours, and most preferably at least about 1 hour. The golf balls are then post-cured to promote cross-linking of the cover material, preferably at a temperature of about 150° F. to 250° F., more preferably about 175° F. for about 2 to 24 hours, more preferably about 4 hours. After post-curing, the golf balls may be cleaned using a suitable cleaner, such as an alcohol, if needed. An example of a suitable alcohol is isopropanol, although any suitable alcohol that does not damage or react with the cover material may be used. After addition of the isocyanate to the cover, the balls are finished as desired.

In a preferred embodiment, the golf ball typically is coated with a durable, abrasion-resistant, relatively non-yellowing finish coat or coats if necessary. The finish coat or coats may have some optical brightener added to improve the brightness of the finished golf ball. In a preferred embodiment, from 0.001 to about 10% optical brightener may be added to one or more of the finish coatings. Preferred finish coatings are solvent based urethane coatings known in the art.

The golf balls of the present invention can be produced by molding processes, which include but are not limited to those that are currently well known in the golf ball art. For example, the golf balls can be produced by injection molding or compression molding the novel cover compositions around a wound or solid molded core to produce an inner ball, which typically has a diameter of about 1.50 to 1.67 inches. The outer layer is subsequently molded over the inner layer to produce a golf ball having a diameter of about 1.680 inches or more. Although either solid cores or wound cores can be used in the present invention, as a result of their lower cost and superior performance, solid molded cores are preferred over wound cores. The standards for both the minimum diameter and maximum weight of the balls are established by the United States Golf Association (U.S.G.A.).

In compression molding, the inner cover composition is formed via injection molding at about 380° F. to about 450° F. into smooth surfaced hemispherical shells which are then positioned around the core in a mold having the desired inner cover thickness and subjected to compression molding at 200° F. to 300° F. for about 2 to 10 minutes, followed by cooling at 50° F. to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar molding techniques to form a dimpled golf ball of a diameter of 1.680 inches or more. To improve the adhesion between the inner cover layer and the outer cover layer, an adhesion promoter may be used. Some adhesion promoters, such as abrasion of the surface, corona treatment, and the like, are known in the art. A preferred adhesion promoter is a chemical adhesion promoter, such as a silane or other silicon compound, preferably N-(2-aminoethyl)3-aminopropyltrimethoxysilane. The intermediate golf ball (core and inner cover layer) may be dipped or sprayed with the chemical, and then the outer cover layer is formed over the treated inner cover layer.

After molding, the golf balls produced may undergo various further processing steps such as buffing, painting and marking as disclosed in U.S. Pat. No. 4,911,451.

The resulting golf ball produced from the hard inner layer and the relatively softer, low flexural modulus outer layer which additionally comprises an isocyanate provide for an improved multi-layer golf ball which provides for desirable coefficient of restitution and durability properties while at the same time offering the feel and spin characteristics associated with soft balata and balata-like covers of the prior art.

Additionally, golf balls of the present invention that comprise polyurethane in any of the inner and outer cover layers may be produced by a reaction injection molding process (RIM) as previously described.

Golf balls and, more specifically, cover layers formed by RIM are preferably formed by the process described in application Ser. No. 09/040,798, filed Mar. 18, 1998, incorporated herein by reference.

The golf balls formed according to the present invention can be coated using a conventional two-component spray coating or can be coated during the RIM process, for example, using an in-mold coating process.

The present invention includes a wide variety of strategies and techniques for improving the scuff resistance of thermoplastic polyurethane covers. For example, various additives could be incorporated in the cover formulation and/or utilized in a post-treatment process after formation of the ball. Such additives include, but are not limited to, isocyanates, capped isocyanates, peroxides, silanes, siloxanes, unsaturated monomers and oligomers, saturated monomers and oligomers, silicones, TPU/silicone copolymers, irradiation, carboxylated monomers and oligomers or other functional monomers or oligomers, fillers such as reinforcing, non-reinforcing, treated or untreated, different TPU's and/or blends of TPU's with other materials and/or polymers (aromatic or aliphatic), and Zylon™ crosslinking additives.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Example 1

Golf balls having thermoplastic polyurethane covers were made. The golf balls were made with dual cores, a high flow ionomer inner cover layer, and a thermoplastic polyurethane outer cover layer. The compositions of the cover layers are shown in the Tables below. The golf balls were then heated to 110° F. to 120° F. and dipped in different solutions and concentrations of isocyanates as shown below. The balls were dipped for either 2 or 5 minutes. After dipping, the balls were allowed to air dry for about one hour, and they were then placed in an oven at 180° F. for about 16 hours. After removal from the oven, some residue was noted on some of the balls. Three balls from each group were rinsed in isopropanol and dried with a rag. All balls were finished with a conventional clear primer and topcoat. The balls were then tested for scuff resistance. The results are shown in Table 6 below. Several control balls that were not dipped in isocyanate were also tested, and the results are shown in Table 6 below.

The scuff resistance test was conducted in the manner described below. The balls that were tested were primed and top coated. A sharp grooved sand wedge (56 degrees loft) was mounted in a mechanical swing machine. The club swing speed used is 60 mph. After each hit, the club face is brushed clean using a nylon bristled brush. A minimum of three samples of each ball were tested. Each ball was hit three times at three different locations so as not to overlap with other strikes. The details of the club face are critical, and are as follows:

Groove width—0.025 inches (cut with a mill cutter, leaving a sharp edge to the groove; no sandblasting or post finishing should be done after milling);

Groove depth—0.016 inches;

Groove spacing (one groove edge to the nearest adjacent edge)—0.105 inches.

For each strike, a point value should be assigned for the worst two defects according to the following table:

| Point Value | Shear Defect |
|---|---|
| 0 | No visible defects |
| 0.5 | Lines |
| 1 | Lifts |
| 2 | Bad Lifts |
| 2 | Tiny (or Paint) Hairs |
| 3 | Bad Hairs |
| 3 | Shears (if land area is removed on "hard" covers (65 Shore D+), rank as the only limit |
| 6 (max value) | Bad Shears (dimples are completely removed, rank as the only defect) |

Example—a strike having a shear, tiny hairs, bad lifts and a line would be ranked as a 5 (3 points for a shear and 2 points for tiny hairs)

Note: The maximum value per strike is 6.

After completing all strikes, determine the average point value. This average point value, or rank, can be correlated to the chart below.

| Rank | Average Point Value |
|---|---|
| Excellent | 0.0–1.0 |
| Very Good | 1.1–2.0 |
| Good | 2.1–3.0 |
| Fair | 3.1–4.0 |
| Borderline | 4.1–5.0 |
| Poor (unacceptable) | 5.1–6.0 |

TABLE 4

Inner Cover Layer Composition

| Ingredient | Amount (Weight %) |
|---|---|
| Surlyn ® 6120 | 25 |
| Surlyn ® 8140 | 50 |
| Surlyn ® 9150 | 25 |

TABLE 5

Outer Cover Layer Composition

| Ingredient | Amount (Weight %) |
|---|---|
| Texin ® DP7-1097 | 81 |
| Masterbatch* | 19 |

*Masterbatch - Texin ® DP7-1097 Masterbatch which consists of pigments, titanium dioxide, etc. in a carrier of the resin used in the cover layer)

TABLE 6

Scuff Test Results

| Name | Type | Sample Code | % NCO | % Solids | Dip Time | Scuff Rank |
|---|---|---|---|---|---|---|
| Control - no dip | None | | | | 0 min | 5 |
| Desmodur N-3200 | Aliphatic HDI | 1 Orange | 23.2 | 99.3 | 2 min | 4 |
| Desmodur N-3200 | Aliphatic HDI | 2 Orange | 23.2 | 50 | 2 min | 1.7 |
| Desmodur N-3200 | Aliphatic HDI | 3 Orange | 23.2 | 25 | 2 min | 1.3 |
| Desmodur N-3200 | Aliphatic HDI | 4 Orange | 23.2 | 10 | 2 min | 1.8 |
| Desmodur N-3200 | Aliphatic HDI | 1 Orange - Rinsed | 23.2 | 99.3 | 2 min | 1.7 |
| Desmodur N-3200 | Aliphatic HDI | 2 Orange - Rinsed | 23.2 | 50 | 2 min | 1.8 |
| Desmodur N-3200 | Aliphatic HDI | 3 Orange - Rinsed | 23.2 | 25 | 2 min | 1.8 |
| Desmodur N-3200 | Aliphatic HDI | 4 Orange - Rinsed | 23.2 | 10 | 2 min | 1.8 |
| Desmodur I | Cycloaliphatic IPDI | 1 Green | 37.5 | 99.5 | 2 min | 5.7 |
| Desmodur I | Cycloaliphatic IPDI | 2 Green | 37.5 | 50 | 2 min | 3 |
| Desmodur I | Cycloaliphatic IPDI | 3 Green | 37.5 | 25 | 2 min | 3.3 |
| Desmodur I | Cycloaliphatic IPDI | 4 Green | 37.5 | 10 | 2 min | 4 |
| Desmodur I | Cycloaliphatic IPDI | 1 Green - Rinsed | 37.5 | 99.5 | 2 min | 2.7 |
| Desmodur I | Cycloaliphatic IPDI | 2 Green - Rinsed | 37.5 | 50 | 2 min | 2 |
| Desmodur I | Cycloaliphatic IPDI | 3 Green - Rinsed | 37.5 | 25 | 2 min | 3.2 |
| Desmodur I | Cycloaliphatic IPDI | 4 Green - Rinsed | 37.5 | 10 | 2 min | 3.7 |
| Desmodur W | Hydrogenated MDI | 1 Blue | 31.8 | 99.5 | 2 min | 4 |
| Desmodur W | Hydrogenated MDI | 2 Blue | 31.8 | 50 | 2 min | 2 |
| Desmodur W | Hydrogenated MDI | 3 Blue | 31.8 | 25 | 2 min | 2 |
| Desmodur W | Hydrogenated MDI | 4 Blue | 31.8 | 10 | 2 min | 2.3 |
| Desmodur W | Hydrogenated MDI | 1 Blue - Rinsed | 31.8 | 99.5 | 2 min | 2 |
| Desmodur W | Hydrogenated MDI | 2 Blue - Rinsed | 31.8 | 50 | 2 min | 2.7 |
| Desmodur W | Hydrogenated MDI | 3 Blue - Rinsed | 31.8 | 25 | 2 min | 2.3 |
| Desmodur W | Hydrogenated MDI | 4 Blue - Rinsed | 31.8 | 10 | 2 min | 2.3 |
| Isonate 125M | Pure MDI | 1 Black | 33.5 | 100 | 2 min | 2.5 |
| Isonate 125M | Pure MDI | 2 Black | 33.5 | 50 | 2 min | 2 |
| Isonate 125M | Pure MDI | 3 Black | 33.5 | 25 | 2 min | 4 |
| Isonate 125M | Pure MDI | 4 Black | 33.5 | 10 | 2 min | 4 |
| Isonate 125M | Pure MDI | 1 Black - Rinsed | 33.5 | 100 | 2 min | 1.3 |
| Isonate 125M | Pure MDI | 2 Black - Rinsed | 33.5 | 50 | 2 min | 1.2 |
| Isonate 125M | Pure MDI | 3 Black - Rinsed | 33.5 | 25 | 2 min | 1.2 |
| Isonate 125M | Pure MDI | 4 Black - Rinsed | 33.5 | 10 | 2 min | 1.3 |
| Isonate 125M | Pure MDI | 1 Black - Rinsed | 33.5 | 100 | 2 min | 1.7 |
| Isonate 125M | Pure MDI | 2 Black - Rinsed | 33.5 | 50 | 2 min | 1.8 |
| Isonate 125M | Pure MDI | 3 Black - Rinsed | 33.5 | 25 | 2 min | 1 |
| Isonate 125M | Pure MDI | 4 Black - Rinsed | 33.5 | 10 | 2 min | 1.2 |
| Isonate 125M | Pure MDI | 1 Red | 33.5 | 25 | 5 min | 4 |
| Isonate 125M | Pure MDI | 1 Red - Rinsed | 33.5 | 25 | 5 min | 1.2 |
| Desmodur I | Cycloaliphatic IPDI | 2 Red | 37.5 | 25 | 5 min | 1.8 |
| Desmodur I | Cycloaliphatic IPDI | 2 Red - Rinsed | 37.5 | 25 | 5 min | 2 |
| Desmodur N-3200 | Aliphatic HDI | 3 Red | 23.2 | 25 | 5 min | 1.5 |
| Desmodur N-3200 | Aliphatic HDI | 3 Red - Rinsed | 23.2 | 25 | 5 min | 1.5 |
| Desmodur W | Hydrogenated MDI | 4 Red | 31.8 | 25 | 5 min | 2.7 |
| Desmodur W | Hydrogenated MDI | 4 Red - Rinsed | 31.8 | 25 | 5 min | 2.3 |

As indicated in the results, the golf balls that were dipped in the MDI solution and rinsed in isopropanol (Black, Rinsed) had the best overall scuff ranking. Within the groups, the golf balls dipped in the 25% solids MDI that were the best. All of the groups of golf balls had better scuff results than the control balls, which were not dipped.

The procedure for dipping was further refined for production to improve efficiency and reduce the processing time. The inventors found that the balls could be oven dried for only 4 hours at 175° F. instead of 16 hours at 180° F., and the isopropanol rinse could be eliminated without adversely affecting the final scuff results.

Example 2

Unrefined or Processed Material with No Post-treatment (Isocyanate Dip)

A series of golf balls were manufactured using base, or unrefined (or processed) materials. The nature of the balls' construction and the properties produced thereby are set forth below.

| Core Type, Size, Riehle | Mantle Type, Thickness | Cover Type, Shore D, Thickness | Letter Code |
|---|---|---|---|
| STP90, 1.470", 136 | STP90, .050" | STP90, 47D, .055" | A |
| STP90, 1.470", 136 | STP90, .050" | STP90, 47D, .055" | B |
| STP, 1.510", 120–122 | STP, .0425" | STP, 50D, .0425" | C |
| STP, 1.510", 120–122 | STP, .0425" | STP, 50D, .0425" | D |
| STP*, 1.540", 94 | STP, .035" | Experimental Ionomer blend 1, 50D, .035" | E |
| STP*, 1.540", 94 | STP, .035" | Experimental Ionomer blend 1, 50D, .035" | F |
| STP**, 1.540", 94 | STP, .035" | DP7-1097, 50D, .035" | G |
| STP**, 1.540", 94 | STP, .035" | DP7-1097, 50D, .035" | H |
| STU*, 1.540", 94 | STU, .035" | Experimental Ionomer blend 2, 47D, .035" | I |
| STU*, 1.540", 94 | STU, .035" | Experimental Ionomer blend 2, 47D, .035" | J |
| STU**, 1.540", 94 | STU, .035" | Texin 285, 47D, .035" | K |
| STU**, 1.540", 94 | STU, .035" | Texin 285, 47D, .035" | L |

**Weight adjusted for TPU cover

STATICS:

| Letter Code | Ball Size | Ball Weight | Ball PGA Comp | COR @ 125 ft./sec. | Cut Rank | Scuff Rank |
|---|---|---|---|---|---|---|
| A | 1.683 | 45.40 | 74 | 0.7922 | 3 | 4.7 |
| B | 1.685 | 45.53 | 73 | 0.7916 | 3 | 4.7 |
| C | 1.683 | 45.11 | 79 | 0.8006 | 3 | 5.7 |
| D | 1.684 | 45.18 | 80 | 0.8010 | 3 | 5.7 |
| E | 1.687 | 45.21 | 78 | 0.8039 | 3 | 6.0 |
| F | 1.688 | 45.31 | 79 | 0.8036 | 3 | 6.0 |
| G | 1.689 | 45.66 | 76 | 0.8011 | 2 | 5.0 |
| H | 1.691 | 45.76 | 76 | 0.8010 | 2 | 5.0 |
| I | 1.686 | 45.13 | 75 | 0.8027 | 3 | 5.0 |
| J | 1.687 | 45.20 | 75 | 0.8017 | 3 | 5.0 |
| K | 1.691 | 45.63 | 73 | 0.8046 | 2 | 3.7 |
| L | 1.692 | 45.73 | 73 | 0.8038 | 2 | 3.7 |
| Controls | | | | | | |
| Strata Tour Pro 90 | 1.682 | 45.66 | 76 | 0.7862 | NA | NA |
| Strata Tour Pro | 1.684 | 45.12 | 82 | 0.8018 | NA | NA |
| STU | 1.684 | 45.62 | 82 | 0.7979 | 3 | 4.8 |
| STU 2 | 1.682 | 45.33 | 86 | 0.8034 | NA | NA |
| Titleist ProV1 | 1.679 | 45.40 | 78 | 0.8037 | 1 | 3.0 |

| Letter Code | Core Size | Core Wt | Core PGA Comp. | Core CoR |
|---|---|---|---|---|
| A | 1.468 | 32.34 | 23 | 0.7964 |
| B | 1.468 | 32.34 | 23 | 0.7964 |
| C | 1.508 | 34.17 | 39 | 0.7728 |
| D | 1.508 | 34.17 | 39 | 0.7728 |
| E | 1.541 | 36.16 | 67 | 0.7996 |
| F | 1.541 | 36.16 | 67 | 0.7996 |
| G | 1.539 | 35.22 | 66 | 0.8038 |
| H | 1.539 | 35.22 | 66 | 0.8038 |
| I | 1.54 | 36.06 | 64 | 0.7937 |
| J | 1.54 | 36.06 | 64 | 0.7937 |
| K | 1.54 | 35.16 | 61 | 0.7991 |
| L | 1.54 | 35.16 | 61 | 0.7991 |

| Letter Code | Mantle Size | Mantle Wt | Mantle PGA Comp | Mantle CoR |
|---|---|---|---|---|
| A | 1.568 | 38.07 | 52 | 0.7994 |
| B | 1.568 | 38.07 | 52 | 0.7994 |
| C | 1.593 | 39.28 | 56 | 0.7969 |
| D | 1.593 | 39.28 | 56 | 0.7969 |
| E | 1.611 | 40.41 | 76 | 0.8105 |
| F | 1.611 | 40.41 | 76 | 0.8105 |
| G | 1.612 | 39.48 | 73 | 0.8120 |
| H | 1.612 | 39.48 | 73 | 0.8120 |
| I | 1.611 | 40.28 | 70 | 0.8079 |
| J | 1.611 | 40.28 | 70 | 0.8079 |
| K | 1.611 | 39.34 | 70 | 0.8131 |
| L | 1.611 | 39.34 | 70 | 0.8131 |

The results indicate that the balls of the invention (without secondary isocyanate treatment) did have scuff and cut resistance that was similar to, if not better than, that of balls having more traditional ionomer or ionomer blend covers. Furthermore, the results indicate that samples of the golf balls having TPU covers, G, H, K and L, alone, without secondary curing, had slightly poorer scuff and cut results than that measured on a commercially available ball with a cast thermoset polyurethane cover (Titleist® ProV1). Consequently, in some instances, the addition of the secondary curing agent (such as the solution of isocyanate) is desirable to further improve durability, The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim as our invention:

1. A golf ball comprising a core, an intermediate layer and a cover, wherein the intermediate layer has a thickness ranging from 0.020 inch to 0.060 inch, wherein the cover is molded from thermoplastic material comprising a polyurethane, polyurea or polyurethane/polyurea composition having a melt index of 15 g/10 min or more at a temperature of 200° C. to 210° C. and a load of 8.7 kg prior to molding, and wherein the cover is treated with a secondary curing agent comprising an isocyanate subsequent to molding.

2. The golf ball of claim 1, wherein the cover has a cross-sectional thickness of 0.075 or less.

3. The golf ball of claim 1, wherein the cover has a cross-sectional thickness of 0.050 or less.

4. The golf ball of claim 1, wherein the cover has a cross-sectional thickness of 0.040 or less.

5. The golf ball of claim 1, wherein the cover has a cross-sectional thickness of 0.030 or less.

6. The golf ball of claim 1, wherein the melt index of the material is 20 g/10 min or more at a temperature of 200° C. to 210° C. and a load of 8.7 kg prior to molding.

7. The golf ball of claim 1, wherein the melt index of the material is 25 g/10 min or more at a temperature of 200° C. to 210° C. and a load of 8.7 kg prior to molding.

8. The golf ball of claim 1, wherein the melt index of the material is 30 g/10 min or more at a temperature of 200° C. to 210° C. and a load of 8.7 kg prior to molding.

9. The golf ball of claim 1, wherein the isocyanate is MDI.

10. A golf ball comprising a core, an intermediate layer and a cover, wherein the intermediate layer is composed of a material selected from the group consisting of ionomer, ionomer blends, thermoplastic polyurethanes, thermosetting polyurethanes, thermoplastic block polyamides, thermoplastic block polyesters, metallocene catalyzed polyolefins, polyamide and ionomer blends, metallocene catalyzed polyamides, and polyphenylene ether and ionomer blends, wherein the cover has a Shore D hardness of 60 or less and is molded from a thermoplastic material comprising a polyurethane, polyurea or polyurethane/polyurea composition having a flex modulus of 30,000 psi or less and a melt index of 15 g/10 min or more at a temperature of 200° C. to 210° C. and a load of 8.7 kg prior to molding, and wherein the cover is treated with a secondary curing agent comprising an isocyanate subsequent to molding.

11. The golf ball of claim 10, wherein the cover has a Shore D hardness of 55 or less.

12. The golf ball of claim 10, wherein the cover has a Shore D hardness of 50 or less.

13. The golf ball of claim 10, wherein the cover has a Shore D hardness of 45 or less.

14. The golf ball of claim 10, wherein the cover additionally comprises an ionomer or non-ionomer material.

15. The golf ball of claim 10, wherein the melt index of the material is 20 g/10 min or more at a temperature of 200° C. to 210° C. and a load of 8.7 kg prior to molding.

16. The golf ball of claim 10, wherein the melt index of the material is 25 g/10 min or more at a temperature of 200° C. to 210° C. and a load of 8.7 kg prior to molding.

17. The golf ball of claim 10, wherein the melt index of the material is 30 g/10 min or more at a temperature of 200° C. to 210° C. and a load of 8.7 kg prior to molding.

18. The golf ball of claim 10, wherein the flex modulus of the material is 20,000 psi or less.

19. The golf ball of claim 10, wherein the flex modulus of the material is 15,000 psi or less.

20. The golf ball of claim 10, wherein the flex modulus of the material is 10,000 psi or less.

21. A golf ball comprising:
   a core;
   an intermediate layer having a thickness ranging from 0.020 inch to 0.060 inch, the intermediate layer formed on the core;
   a cover molded on said intermediate layer and said core, said cover formed from a polymeric cover composition that includes a polyurethane, said cover composition having a melt index prior to molding said cover of from about 15 to about 85 grams per 10 minutes at a temperature of 200° C. to 210° C. and a load of 8.7 kg, and wherein the cover is treated by the application of an isocyanate subsequent to molding.

22. The golf ball of claim 21, wherein said polyurethane in said cover composition has a melt index of from about 25 to about 50 grams per 10 minutes at a temperature of 200° C. to 210° C. and a load of 8.7 kg.

* * * * *